Patented July 9, 1929.

1,719,930

UNITED STATES PATENT OFFICE.

HAROLD GRAY, OF AKRON, OHIO, ASSIGNOR TO THE B. F. GOODRICH COMPANY, OF NEW YORK, N. Y., A CORPORATION OF NEW YORK.

METHOD OF MAKING COMPOSITE PRODUCT.

No Drawing.    Application filed April 22, 1927.    Serial No. 185,913.

This invention relates to composite products and particularly to products constructed by uniting rubber compositions to metals and it has for an object to produce a practical industrial method for firmly uniting rubber compositions to metals, and particularly to the ferrous metals, and to products produced in accordance with this method.

A problem of long standing in the industrial arts has been to discover a means for firmly and permanently bonding various materials to metals and particularly rubber to ferrous metals, and many methods have been heretofore proposed for accomplishing this result. It is the purpose of the present invention to provide a practical means for the solution of this problem which will have the advantage of simplicity and will at the same time produce a strong, permanent bond of various materials to metal. The invention has been found to be particularly adapted to the adhesion of rubber compositions to ferrous metal and is herein described in connection therewith. It is to be understood however that the method is of a broader application and that various other materials may be adhered to metal generally by the process herein described.

The invention of this application is based upon the discovery that where a clean surface of metal is covered with a coating or film of certain materials and then covered with rubber cement, the metal may be firmly adhered to a rubber composition if the assembled product is subjected to heat and pressure. The materials which may be employed for forming the film coating on the metal are not limited to any particular well recognized class of materials but form an empirical class which may be defined generally as materials which under the influence of heat will react to form an interfacial layer having strong adhesive properties both with respect to the metal and to the rubber. Generally, the material should be intimately associated with the metal and for this reason the metal surface should be thoroughly cleansed, as by sandblasting or as by a pickling process, and the material should be spread thereon so as to make a close contact in a continuous film with the metal. I have found that where the materials to be employed for the film coating are liquid, they may be painted on with a brush or may be sprayed on with an air gun, and in case the materials are solid they may be dissolved in any suitable solvent and then applied, or in certain cases, satisfactory results have been obtained by spreading the solid material over the metal by means of a spatula or other suitable mechanism. Alternatively, the film-forming material may be mixed into a rubber cement and the two sprayed on the cleansed surface of the metal together, but adhesions obtained by this method are not quite as strong and it is recommended for use only in work in which economy in manufacturing operations outweighs the advantage of a firmer union.

Among the materials which I have found to have the common property of reacting with rubber at vulcanization temperatures to form an interfacial layer strongly adhesive to metals and to rubber, and which may be said to form the empirical class or group of the present application are the following: sulfuric acid, nitric acid, selenic acid, selenium oxychloride, antimony penta-chloride, antimony tri-bromide, cuprous chloride, ferric fluoride, lead chromate, mercuric chloride, nickel chloride, phosphorous oxychloride, phosphorous tri-chloride, phosphorous penta-chloride, aluminum chloride, ferrous chloride, chlorsulfonic acid, titanium tetra-chloride, cobalt chloride, cupric chloride, di-methyl sulfate, di-ethyl sulfate, hexachlorethane, penta-chlorethane, benzo-tri-chloride, benzyl chloride, iodoform, naphthalene tetra-chloride, benzene sulfochloride, p-nitro-benzoylchloride.

All of the above materials when employed in the process herein described give extremely strong adhesions of rubber to ferrous metals. Other materials may be also employed in this process, but in general not with as satisfactory results as the hereinabove described materials. Some of these materials, which may be said to belong to the same empirical class as the materials hereinabove listed, include: hydrochloric acid, hydrofluoric acid, arsenic acid, phosphorous penta-sulfide, antimony iodide, ferrous nitrate, sodium stannate, aluminum nitrate, ferric nitrate, bismuth nitrate, chromium chloride, iodine tri-chloride.

Rubber cements having various characteristics may be employed as a cover coat for the films of the materials above listed. A rubber cement in benzol, gasoline, or other organic solvent, has been found to be satisfactory. This cement, however, may contain vulcanizing agents if desired and cements prepared from rubber derivatives, gutta-percha, balata, or other rubber-like gums, either with or without vulcanizing agents, may be employed, and the term "rubber cement" where used herein is intended to include solutions or dispersions of these materials in organic solvents.

In a preferred embodiment of carrying out this invention a surface of a metal body is cleansed, as by sandblasting, and is then coated with one of the above named materials in any suitable manner, care being taken to produce a continuous film covering all portions of the cleansed metal surface. This film is then covered with a rubber cement, preferably applied by a spray gun in order not to disturb the underlying film, and the cement permitted to dry to such a point as to leave a tacky surface. A rubber composition of any desired characteristics, either curable or non-curable, or other composition adhesive to rubber, such as wood, leather, fabric, etc., is then applied to the coated metal and the assembled unit subjected to heat and pressure. In case a vulcanizable rubber composition is employed, the heat should be for such time and at such temperature as to effect the desired vulcanization of the rubber composition. Upon cooling, it will be found that a composite product in which the metal and other material are united with an extremely strong bond is produced.

It has also been found that where a rubber composition is to be bonded to metal, that the cover-coat of rubber cement of the above process may be omitted and the rubber composition applied directly to the film-coated metal and united by heat and pressure. This modification of the process does not give the same firm union of parts as is obtained by the above indicated preferred process, but is satisfactory for many purposes.

Exhaustive tests of the adhesive strength of all the materials hereinabove mentioned have been made. In one series of such tests, a vulcanizable rubber composition was frictioned and spread onto a heavy canvas fabric to give a reinforced rubber slab one eighth inch thick, and this slab of rubber composition was vulcanized in a press in contact with steel plates coated with the various materials hereinabove enumerated. When cool, these composite products were tested in the well known Cooey machine. In carrying out tests in this machine, the two sections of the composite product are initially separated, by cutting or pulling apart, and the free end of each section clamped in a jaw of the machine. The two jaws are then moved away from each other in a linear direction at a uniform speed of one inch per minute, and indicating apparatus records the force necessary to pull apart the sections at this speed. This force is interpolated into pounds per inch width of the sections being separated and the resulting value is known as the friction pull. For purpose of comparison, cleansed steel plates were covered with various rubber cements of high quality, and the reinforced rubber slab vulcanized in contact therewith. All such test pieces showed a friction pull of between 1 and 2 pounds per inch.

Data of a few of the tests hereinabove referred to are given below for the purpose of illustrating the extremely high friction pull resulting from the process of this application as compared with rubber cements.

*Example 1.*—A cleansed steel plate was sprayed with diethyl sulfate to form a continuous film thereon, which was then covered with a coating of rubber cement, sprayed thereonto so as not to disturb the film of diethyl sulfate. The cement was allowed to dry and a curable rubber composition, reinforced with canvas as above described, was vulcanized thereagainst. Test of the resulting product on a Cooey machine showed a friction pull of 49 pounds per inch.

*Example 2.*—A similar construction to that of Example 1, in which the steel plate after being coated with the diethyl sulfate was not covered with a rubber cement, but the reinforced rubber composition superposed on the diethyl sulfate film and vulcanized in contact therewith, showed a friction pull of 25 pounds per inch.

*Example 3.*—In another test, hexachlorethane was sprayed onto a plate of clean steel, and a reinforced vulcanizable rubber slab cured thereto. A friction pull of 15 pounds per inch was obtained on test of the resulting product.

*Example 4.*—Concentrated sulfuric acid was brushed on a steel plate, a coat of rubber cement sprayed thereon and a reinforced rubber slab vulcanized thereagainst. On test, the composite product showed a friction pull of 14 pounds per inch.

*Example 5.*—Another construction similar to that of Example 4 and in which the sulfuric acid was replaced by concentrated nitric acid, gave a friction pull of 17 pounds per inch.

*Example 6.*—In another construction, 20 parts of antimony penta chloride were admixed into 100 parts of a rubber cement containing approximately 10 percent of rubber. The treated cement was then sprayed on a cleansed surface of a steel plate and a reinforced rubber slab vulcanized thereagainst. The resulting composite product showed on test a friction pull of 12 pounds per inch.

It will be understood that various modifications of the above described procedure may be employed within the principles of the above invention which consists broadly in the steps hereinabove defined and which is not limited to the specific materials hereinabove mentioned, it being understood that any material, either an organic or inorganic compound, which will react with rubber at vulcanization temperatures to produce an interfacial layer strongly adhesive to the metal is within the scope of this invention.

I claim:

1. The herein described method of bonding rubber to metal which comprises coating the metal surface with a material composed in whole or in part of a substance selected from the empirical class comprising sulfuric acid, nitric acid, selenic acid, selenium oxychloride, antimony penta chloride, antimony tri bromide, cuprous chloride, ferric fluoride, lead chromate, mercuric chloride, nickel chloride, phosphorous oxychloride, phosphorous trichloride, phosphorous penta chloride, aluminum chloride, ferrous chloride, chlor-sulfonic acid, titanium tetra-chloride, cobalt chloride, cupric chloride, di-methyl sulfate, di-ethyl sulfate, hexachlorethane, pentachlorethane, benzo-tri-chloride, benzyl chloride, iodoform, naphthalene tetra-chloride, benzene sulfochloride, and p-nitro-benzoylchloride, superposing thereon a vulcanizable rubber composition, and subjecting the assemblage under pressure to vulcanizing temperatures.

2. The herein described method of bonding a rubber composition to ferrous metals which comprises coating the metal surface with a material composed in whole or in part of a substance selected from the empirical class comprising sulfuric acid, nitric acid, selenic acid, selenium oxychloride, antimony penta chloride, antimony tri bromide, cuprous chloride, ferric fluoride, lead chromate, mercuric chloride, nickel chloride, phosphorous oxychloride, phosphorous tri-chloride, phosphorous penta chloride, aluminum chloride, ferrous chloride, chlor-sulfonic acid, titanium tetra-chloride, cobalt chloride, cupric chloride, di-methyl sulfate, di-ethyl sulfate, hexachlorethane, penta-chlorethane, benzo tri-chloride, benzyl chloride, iodoform, naphthalene tetra-chloride, benzene sulfochloride, and p-nitro-benzoylchloride, superposing thereon a vulcanizable rubber composition, and subjecting the assemblage under pressure to vulcanizing temperatures.

3. The herein described method of bonding rubber to metals which comprises coating the metal surface with a material composed in whole or in part of a substance selected from the empirical class comprising sulfuric, nitric, hydrochloric, hydrofluoric, arsenic or selenic acid, covering said coating with a film of rubber cement, superposing thereon a vulcanizable rubber composition and subjecting the assemblage under pressure to vulcanizing temperature.

4. The herein described method of bonding rubber to metals which comprises coating the metal surface with a material composed in whole or in part of a substance selected from the empirical class comprising sulfuric, nitric, hydrochloric, hydrofluoric, arsenic and selenic acids and the chlorides of polyvalent metals, covering said coating with a film of rubber cement, superposing thereon a vulcanizable rubber composition and subjecting the assemblage under pressure to vulcanizing temperature.

5. The herein described method of bonding rubber to metals which comprises coating the metal surface with a material composed in whole or in part of a substance selected from the empirical class comprising sulfuric acid, nitric acid, selenic acid, lead chromate, chlorsulfonic acid, di-methyl sulfate, di-ethyl sulfate, hexachlorethane, pentachlorethane, covering said coating with a film of rubber cement, superposing thereon a vulcanizable rubber composition and subjecting the assemblage under pressure to vulcanizing temperature.

6. The herein described method of bonding rubber to metals which comprises coating the metal surface with a material composed in whole or in part of a substance selected from the empirical class comprising sulfuric acid, nitric acid, selenic acid, selenium oxychloride, phosphorous oxychloride, antimony pentachloride, antimony tri-bromide, nickel chloride, titanium tetrachloride, covering said coating with a film of rubber cement, superposing thereon a vulcanizable rubber composition and subjecting the assemblage under pressure to vulcanizing temperature.

7. The herein described method of bonding rubber to metal which comprises coating the metal surface with a material composed in whole or in part of a substance selected from the empirical class comprising sulfuric acid, nitric acid, selenic acid, selenium oxychloride, antimony penta-chloride, antimony tri-bromide, cuprous chloride, ferric fluoride, lead chromate, mercuric chloride, nickel chloride, phosphorous oxychloride, phosphorous trichloride, phosphorous penta-chloride, aluminum chloride, ferrous chloride, chlor-sulfonic acid, titanium tetra-chloride, cobalt chloride, cupric chloride, di-methyl sulfate, di-ethyl sulfate, hexachlorethane, pentachlorethane, benzo-tri-chloride, benzyl chloride, iodoform, naphthalene tetra-chloride, benzene sulfochloride, and p-nitro-benzoylchloride, superposing thereon a vulcanizable rubber composition, covering said coating with a film of rubber cement, and subjecting the assemblage under pressure to vulcanizing temperatures.

8. The herein described method of bonding a rubber composition to ferrous metals which comprises coating the metal surface with a material composed in whole or in part of a substance selected from the empirical class comprising sulfuric acid, nitric acid, selenic acid, selenium oxychloride, antimony penta-chloride, antimony tri-bromide, cuprous chloride, ferric fluoride, lead chromate, mercuric chloride, nickel chloride, phosphorous oxychloride, phosphorous tri-chloride, phosphorous penta-chloride, aluminum chloride, ferrous chloride, chlor-sulfonic acid, titanium tetra-chloride, cobalt chloride, cupric chloride, di-methyl sulfate, di-ethyl sulfate, hexachlorethane, penta-chlorethane, benzo tri-chloride, benzyl chloride, iodoform, naphthalene tetra-chloride, benzene sulfochloride, and p-nitro-benzoylchloride, superposing thereon a vulcanizable rubber composition, covering said coating with a film of rubber cement, and subjecting the assemblage under pressure to vulcanizing temperatures.

In witness whereof I have hereunto set my hand this 20th day of April, 1927.

HAROLD GRAY.